US007035798B2

(12) United States Patent
Kobayashi

(10) Patent No.: US 7,035,798 B2
(45) Date of Patent: Apr. 25, 2006

(54) SPEECH RECOGNITION SYSTEM INCLUDING SPEECH SECTION DETECTING SECTION

(75) Inventor: Hajime Kobayashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 465 days.

(21) Appl. No.: 09/949,980

(22) Filed: Sep. 12, 2001

(65) Prior Publication Data

US 2002/0046026 A1 Apr. 18, 2002

(30) Foreign Application Priority Data

Sep. 12, 2000 (JP) ............................. 2000-277025

(51) Int. Cl.
*G10L 15/20* (2006.01)
*G10L 15/08* (2006.01)
*G10L 15/06* (2006.01)

(52) U.S. Cl. ....................... 704/233; 704/236; 704/243

(58) Field of Classification Search ................. 704/233
See application file for complete search history.

(56) References Cited

U.S. PATENT DOCUMENTS 4,672,669 A * 6/1987 DesBlache et al. .......... 704/237
4,783,806 A 11/1988 Nakamura et al. ............ 381/43
5,276,765 A * 1/1994 Freeman et al. ............ 704/233
5,611,019 A * 3/1997 Nakatoh et al. ............ 704/233
5,649,055 A 7/1997 Gupta et al. ............... 395/2.42
5,749,067 A * 5/1998 Barrett ........................ 704/233
5,991,718 A 11/1999 Malah ........................ 704/233
2002/0004952 A1* 1/2002 Deak et al. ................. 704/246

FOREIGN PATENT DOCUMENTS

WO WO 00/46790 8/2000

* cited by examiner

*Primary Examiner*—W. R. Young
*Assistant Examiner*—Brian L. Albertalli
(74) *Attorney, Agent, or Firm*—Drinker Biddle & Reath LLP

(57) ABSTRACT

A trained vector generation section 16 generates beforehand a trained vector v of unvoiced sounds. An LPC Cepstrum analysis section 18 generates a feature vector A of a voice within the non-voice period, an inner product operation section 19 calculates an inner product value $V^TA$ between the feature vector A and the trained vector V, and a threshold generation section 20 generates a threshold θv on the basis of the inner product value $V^TA$. Also, the LFC Cepstrum analysis section 18 generates a prediction residual power ε of the signal within the non-voice period, and the threshold generation section 22 generates a threshold THD on the basis of the prediction residual power ε. If the voice is actually uttered, the LPC Cepstrum analysis section 18 generates the feature vector A and the prediction residual power ε, the inner product operation section 19 calculates an inner product value $V^TA$ between the feature vector A of input signal Saf and the trained vector V, and a threshold determination section 21 compares the inner product value $V^TA$ with the threshold θv and determines the voice section if $\theta v \leqq V^TA$. Also, a threshold determination section 23 compares the prediction residual power ε of input signal Saf with the threshold THD and determines the voice section if $THD \leqq \epsilon$. The voice section is finally defined if $\theta v \leqq V^TA$ or $THD \leqq \epsilon$, and the input signal Svc for voice recognition is extracted.

2 Claims, 4 Drawing Sheets

SPEECH RECOGNITION SYSTEM INCLUDING SPEECH SECTION DETECTING SECTION

BACKGROUND OF THE INVENTION

1. Field of the Invention

The present invention relates to a voice recognition system, and more particularly to a voice recognition system in which the detection precision of the voice section is improved. As used herein, voice recognition means speech recognition.

2. Description of the Related Art

In the voice recognition system, when the voice uttered in noisy environments, for example, is directly subjected to voice recognition, the voice recognition ratio may be degraded due to the influence of noise. Therefore, it is firstly important to correctly detect a voice section to make the voice recognition.

The conventional well-known voice recognition system for detecting the voice section using a vector inner product was configured as shown in FIG. 4.

This voice recognition system creates an acoustic model (voice HMM) in units of word or subword (e.g., phoneme or syllable), employing an H (Hidden Markov Model), produces a series of observed values that is a time series of Cepstrum for an input signal if the voice to be recognized is uttered, collates the series of observed values with the voice HMM, and selects the voice HMM with the maximum likelihood which is then output as the recognition result.

More specifically, a large quantity of voice data Sm collected and stored in a training voice database is partitioned in a unit of frame for a predetermined period (about 10 to 20 msec), time series of Cepstrum is acquired by making Cepstrum operation on each data of frame unit successively, further this time series of Cepstrum are trained as a feature quantity of voice, and reflected to the parameters of an acoustic model (voice HMM), whereby the voice HMM in a unit of word or subword is produced.

Also, a voice section detection section for detecting the voice section comprises the acoustic analyzers 1, 3, an eigenvector generating section 2, an inner product operation section 4, a comparison section 5, and a voice extraction section 6.

Herein, an acoustic analyzer 1 makes acoustic analysis of voice data Sm in the training voice database for every frame number n to generate an M-dimensional feature vector $x_n=[x_{n1}\ x_{n2}\ x_{n3}\ \ldots\ x_{nM}]^T$. Here, T denotes the transposition.

The eigenvector generation section 2 generates a correlation matrix R represented by the following expression (1) from the M-dimensional feature vector $x_n$, and the correlation matrix R is expanded into eigenvalues by solving the following expression (2) to obtain an eigenvector (called a trained vector) V.

$$R = \frac{1}{N}\sum_{n=1}^{N} X_n X_n^T \quad (1)$$

$$(R-\lambda_k I)v_k = 0 \quad (2)$$

where k=1, 2, 3, . . . , M;

I denotes a unit matrix; and 0 denotes a zero vector.

Thus, the trained vector V is calculated beforehand on the basis of the training voice data Sm. If the input signal data Sa is actually produced when the voice is uttered, the acoustic analysis section 3 analyzes the input signal Sa to generate a feature vector A. The inner product operation section 4 calculates the inner product of the trained vector V and the feature vector A. Further, the comparison section 5 compares the inner product value $V^TA$ with a fixed threshold θ, and if the inner product value $V^TA$ is greater than the threshold θ, the voice section is determined.

And the voice extraction section 6 is turned on (conductive) during the voice section determined as described above, and extracts data Svc for voice recognition from the input signal Sa, and generate a series of observed values to be collated with the voice HMM.

By the way, with the conventional method for detecting the voice section using the vector inner product, the threshold θ is fixed at zero (θ=0). And if the inner product value $V^TA$ between the feature vector A of the input signal Sa obtained under the actual environment and the trained vector V is greater than the fixed threshold θ, the voice section is determined.

Therefore, in the case where the voice is uttered in the less noisy background, considering the relation among the feature vector of noise (noise vector) in the input signal obtained under the actual environment, the feature vector of proper voice (voice vector), the feature vector A of input signal obtained under the actual environment, and the trained vector V in a linear spectral domain, the noise vector is small, and the voice vector of proper voice is dominant, as shown in FIG. 5A, whereby the feature vector A of input signal obtained under the actual environment points to the same direction as the voice vector and the trained vector V.

Accordingly, the inner product value $V^TA$ between the feature vector A and the trained vector V is a positive (plus) value, whereby the fixed threshold θ(=0) can be employed as the determination criterion to detect the voice section.

However, in a place where there is a lot of noise with lower S/N ratio, for example, within a chamber of the vehicle, the noise vector is dominant, and the voice vector is relatively smaller, so that the feature vector A of input signal obtained under the actual environment is an opposite direction to the voice vector and the trained vector V, as shown in FIG. 5B. Accordingly, the inner product value $V^TA$ between the feature vector A and the trained vector V is a negative (minus) value, whereby there is the problem that the fixed threshold θ(=0) can not be employed as the determination criterion to detect the voice section correctly.

In other words, if the voice recognition is made in the place where there is a lot of noise with lower S/N ratio, the inner product value $V^TA$ between the feature vector A and the trained vector V is a negative value ($V^TA<\theta$) even when the voice section should be determined, resulting in the problem that the voice section can not be correctly detected, as shown in FIG. 5C.

SUMMARY OF THE INVENTION

The present invention has been achieved to solve the conventional problems as described above, and it is an object of the invention to provide a voice recognition system in which the detection precision of voice section is improved.

In order to accomplish the above object, according to the present invention, there is provided a voice recognition system having a voice section detecting section for detecting a voice section that is subjected to voice recognition, the voice section detecting section comprising a trained vector creating section for creating beforehand a trained vector for the voice feature, a first threshold generating section for generating a first threshold on the basis of the inner product value between a feature vector of sound occurring within a non-voice period and the trained vector, and a first determination section for determining a voice section if the inner product value between a feature vector of an input signal produced when the voice is uttered and the trained vector is greater than or equal to the first threshold.

With such a constitution, a feature vector only for the background sound is generated in the non-voice period (i.e., period for which no voice is uttered actually), and the first threshold is generated under the actual environment on the basis of the inner product value between the feature vector and the trained vector.

If the voice is actually uttered, the inner product between the feature vector of input signal and the trained vector is obtained, and if the inner product value is greater than or equal to the first threshold, the voice section is determined.

Since the first threshold can be appropriately adjusted under the actual environment, the inner product value between the feature vector of input signal produced by an actrual utterance and the trained vector is judged on the basis of the first threshold, whereby the detection precision of voice section is improved.

Also, in order to accomplish the above object, the invention provides the voice recognition system, further comprising a second threshold generating section for generating a second threshold on the basis of a prediction residual power of sound occurring within the non-voice period, and a second determination section for determining the voice section if the prediction residual power of an input signal produced when the voice is uttered is greater than or equal to the second threshold, wherein the input signal in the voice section determined by any one or both of the first determination section and the second determination section is subjected to voice recognition.

With such a constitution, the first determination section determines the voice section on the basis of the inner product value between the feature vector of input signal and the trained vector. Also, the second determination section determines the voice section on the basis of the prediction residual power of input signal. And the input signal corresponding to the voice section determined by at least one of the first and a second determination section is subjected to voice recognition. In particular, by determining the voice section on the basis of the inner product value between the feature vector of input signal and the trained vector, it is possible to exhibit an effective function to detect the voice section containing unvoiced sounds correctly. Also, by determining the voice section on the basis of the prediction residual power of input signal, it is possible to exhibit an effective function to detect the voice section containing voiced sounds correctly.

DETAILED DESCRIPTION OF THE PRESENT INVENTION

Figure 1:
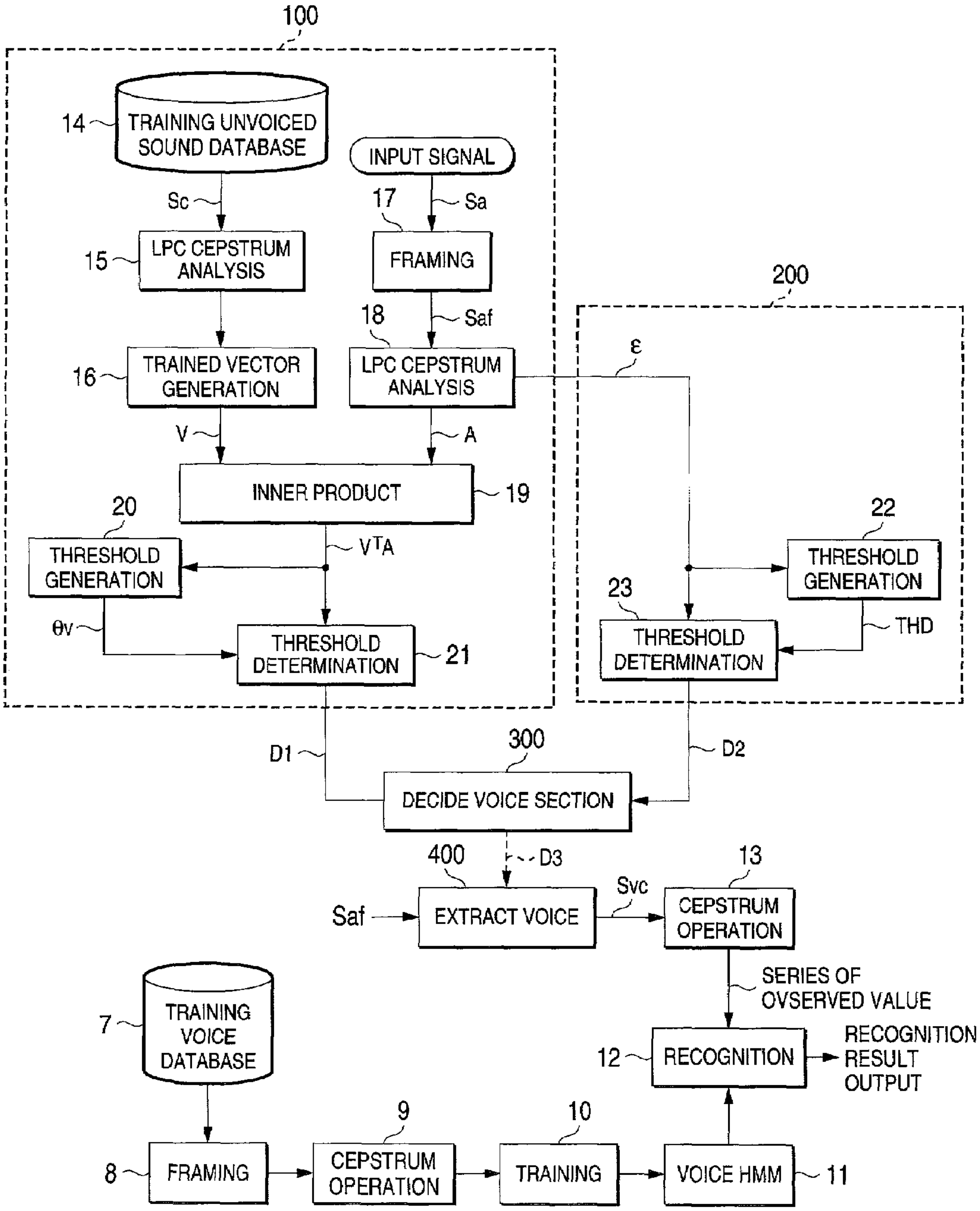
FIG. 1 is a block diagram showing the configuration of a voice recognition system according to an embodiment of the present invention.

The preferred embodiments of the invention will be described below with reference to the accompanying drawings. FIG. 1 is a block diagram showing the configuration of a voice recognition system according to an embodiment of the invention.

In FIG. 1, this voice recognition system comprises an acoustic model (voice HMM) 11 in units of word or subword created employing a Hidden Markov Model, a recognition section 12, and a Cepstrum operation section 13, in which the recognition section 12 collates a series of observed values that is time series of Cepstrum for an input signal produced in the Cepstrum operation section 13 with the voice HMM 11, and selects the voice HMM with the maximum likelihood to output this as the recognition result.

More specifically, a framing section 8 partitions the voice data Sm collected and stored in a training voice database 7 into units of frame of a predetermined period (about 10 to 20 msec), a Cepstrum operation section 9 makes Cepstrum operation on the voice data in a unit of frame successively to acquire time series of Cepstrum, and further a training section 10 trains this time series of Cepstrum as a feature quantity of voice, whereby the voice HMM 11 in a unit of word or subword is prepared.

And the Cepstrum operation section 13 makes Cepstrum operation on the actual data Svc extracted by detecting the voice section, as will be described later, to generate the series of observed values, and the recognition section 12 collates the series of observed values with the voice HMM 11 in a unit of word or subword to perform the voice recognition.

Moreover, this voice recognition system comprises a voice section detection section for detecting the voice section of actually uttered voice (input signal) to extract the input signal data Svc as the voice recognition object. Also, the voice section detection section comprises a first detection section 100, a second detection section 200, a voice section decision section 300, and a voice extraction section 400.

Herein, the first detection section 100 comprises a training unvoiced sounds database 14 for storing the data for unvoiced sound portion of voice (unvoiced sounds data) Sc collected in advance, an LPC Cepstrum analysis section 15, and a trained vector generation section 16.

The LPC Cepstrum analysis section 15 makes LPC (Linear Predictive Coding) cepstrum analysis of the unvoiced sounds data Sc in the training unvoiced sounds database 14 in a unit of frame of a predetermined period (about 10 to 20 msec) to generate an M-dimensional feature vector $c_n=[c_{n1}\ c_{n2}\ c_{n3}\ \ldots\ c_{nM}]^T$.

The trained vector generating section 16 generates a correlation matrix R represented by the following expression (3) from an M-dimensional feature vector $c_n$, and expands the correlation matrix R into eigenvalues to obtain M eigenvalues λk and an eigenvector vk. Further, a trained vector v is defined as an eigenvector corresponding to the maximum eigenvalue among the M eigenvalues λk, and thereby can represent the feature of unvoiced sound excellently. Note that variable n denotes the frame number and T denotes transposition in the following expression (3).

$$R = \frac{1}{N}\sum_{n=1}^{N} c_n c_n^T \qquad (3)$$

Further, the first detection section 100 comprises a framing section 17 for framing the input signal data Sa of actually spoken voice in a unit of frame of a predetermined period (about 10 to 20 msec), an LPC Cepstrum analysis section 18, an inner product operation section 19, a threshold generation section 20 and a first threshold determination section 21.

The LPC Cepstrum analysis section 18 makes LPC analysis for the input signal data Saf in a unit of frame that is output from the framing section 17 to obtain an M-dimensional feature vector A in the Cepstrum domain and a prediction residual power $\epsilon$.

The inner product operation section 19 calculates an inner product value $V^TA$ between the trained vector V generated beforehand in the trained vector generation section 16 and the feature vector A.

The threshold generation section 20 produces the inner product between the feature vector A and the trained vector V that is obtained in the inner product operation section 19 within a predetermined period (non-voice period) $\tau$1 from the time when the speaker turns on a speech start switch (not shown) provided in this voice recognition system to the time of starting the speech actually, and further calculates a time average value G of inner product values $V^\tau A$ for a plurality of frames within the non-voice period $\tau$1. And the time average value G and an adjustment value a obtained experimentally are added, and its addition value as a first threshold $\theta v$ (=G+$\alpha$) is supplied to the threshold determination section 21.

The first threshold determination section 21 compares the inner product value $V^TA$ output from the inner product operation section 19 with the threshold $\theta v$, after elapse of the non-voice period $\tau$1, and if the inner product value $V^TA$ is greater than the threshold $\theta v$, the voice section is determined and its determination result D1 is supplied to the voice section determination section 300.

That is, if after elapse of the non-voice period $\tau$1, the voice is actually uttered and the framing section 17 partitions the input signal Sa into input signal data Saf in a unit of frame, the LPC Cepstrum analysis section 18 makes LPC Cepstrum analysis for the input signal data Saf in a unit of frame to produce the feature vector A of the input signal data Saf and the prediction residual power $\epsilon$. Further, the inner product operation section 19 calculates the inner product between the feature vector A of the input signal data Saf and the trained vector V. And the first threshold determination section 21 make a comparison between the inner product value $V^TA$ and the threshold $\theta v$, and if the inner product value $V^TA$ is greater than the threshold $\theta v$, the voice section is determined and its determination result D1 is supplied to the voice section determination section 300.

The second detection section 200 comprises a threshold generation section 22 and a second threshold determination section 23.

The threshold generation section 22 calculates a time average value E of the prediction residual power $\epsilon$ obtained in the LPC Cepstrum analysis section 18 within an non-voice period $\tau$1 from the time when the speaker turns on the speech start switch to the time of starting the speech actually, and further adds the time average value E and an adjustment value $\beta$ obtained experimentally to obtain a threshold THD (=E+$\beta$), which is then supplied to the threshold determination section 23.

The second threshold determination section 23 compares the prediction residual power $\epsilon$ obtained in the LPC Cepstrum analysis section 18 with the threshold THD, after elapse of the non-voice period $\tau$1, and if the prediction residual power $\epsilon$ is greater than or equal to the threshold THD, the voice section is determined and its determination result D2 is supplied to the voice section determination section 300.

That is, if after elapse of the non voice period $\tau$1, the voice is actually uttered and the framing section 17 partitions the input signal data Sa into input signal data Saf in a unit of frame, the LPC Cepstrum analysis section 18 makes LPC Cepstrum analysis for the input signal data Saf in a unit of frame to produce the feature vector A of the input signal data Saf and the prediction residual power $\epsilon$. Further, the second threshold determination section 23 compares the prediction residual power $\epsilon$ with the threshold THD, and if the prediction residual power $\epsilon$ is greater than the threshold THD, the voice section is determined and its determination result D2 is supplied to the voice section determination section 300.

The voice section determination section 300 determines the voice section $\tau$2 of the input signal Sa as the time when the determination result D1 is supplied from the first detection section 100 and the time when the determination result D2 is supplied from the second detection section 200. That is, when either one of the conditions $\theta v \leqq V^TA$ and THD$\leqq \epsilon$ is satisfied, the voice section $\tau$2 is determined, and its determination result D3 is supplied to the voice extraction section 400.

The voice extraction section 400 cuts out the input signal data Svc to be recognized from the input signal data Saf in a unit of frame that is supplied from the framing section 17 by detecting the voice section ultimately, on the basis of the determination result D3, thereby supplying the input signal data Svc to the Cepstrum operation section 13.

And the Cepstrum operation section 13 generates a series of observed values of the input data Svc extracted in the Cepstrum domain, and further the recognition section 12 collates the series of observed values with the voice HMM 11 to make the voice recognition.

In this way, with the voice recognition system of this embodiment, the first detection section 100 mainly exhibits an effective function for detecting correctly the voice section of unvoiced sounds, and the second detection section 200 mainly exhibits an effective function for detecting correctly the voice section of voiced sounds.

That is, the first detection section 100 calculates an inner product between the trained vector V of unvoiced sounds created on the basis of the training unvoiced sounds data Sc and the feature vector A of the input signal data Saf produced in the actual speech, and if the inner product $V^TA$ calculated is greater than the threshold $\theta v$, the non-voice period in the input signal Sa is determined. Namely, the unvoiced sounds with relatively small power can be detected at high precision.

The second detection section 200 compares the prediction residual power $\epsilon$ of the input signal data produced in the actual speech with the threshold THD obtained in advance on the basis of the prediction residual power of the non-voice period, and if the prediction residual power $\epsilon$ is greater than or equal to the threshold THD, the voiced sounds period in the input signal data Sa is determined. Namely, the voiced sounds with relatively large power can be detected at high precision.

And the voice section determination section determines finally the voice section (i.e., period of voiced sounds and unvoiced sounds) on the basis of the determination results D1 and D2 of the first and second detection sections 100 and 200, and the input signal data Dvc to be recognized is extracted on the basis of its determination result D3, whereby the precision of voice recognition can be enhanced The voice section may be decided on the basis of both the determination result D1 of the first detection section 100 and the determination result D2 of the second detection section 200, or any one of the determination result D1 of the first detection section 100 and the determination result D2 of the second detection section 200.

Further, the LPC Cepstrum analysis section 18 generates a feature vector A of background noise alone in the non voice period τ1. And the inner product value $V^T A$ between the feature vector A in the non-voice period and the trained vector V plus a predetermined adjustment value α, i.e., value $V^T A+\alpha$, is defined as the threshold θv. Therefore, the threshold θv that is the determination criterion for detecting the voice section can be appropriately adjusted under the actual environment where the background noise practically occurs, whereby the precision of detecting the voice section can be enhanced.

Figure 5A:
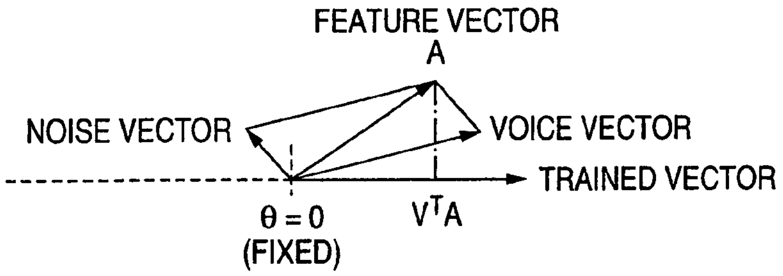
FIG. 5A RELATED ART
FIGS. 5A to 5C are diagrams for explaining the problem with a detection method for detecting the voice section by applying the conventional vector inner product technique.
Figure 5B:
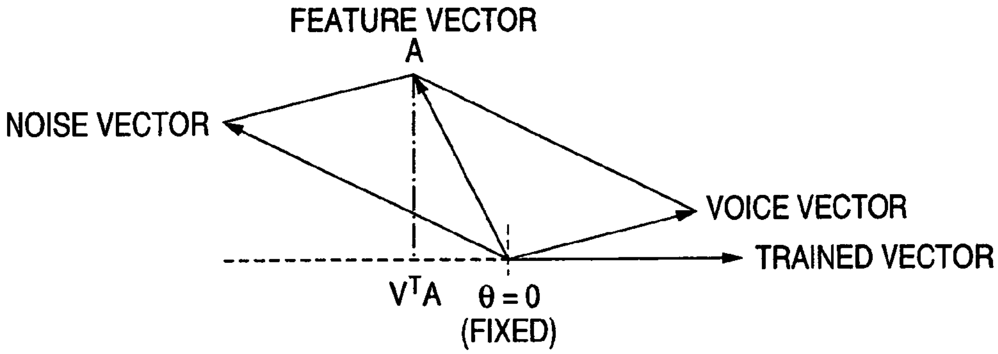
FIG. 5B RELATED ART
Figure 5C:
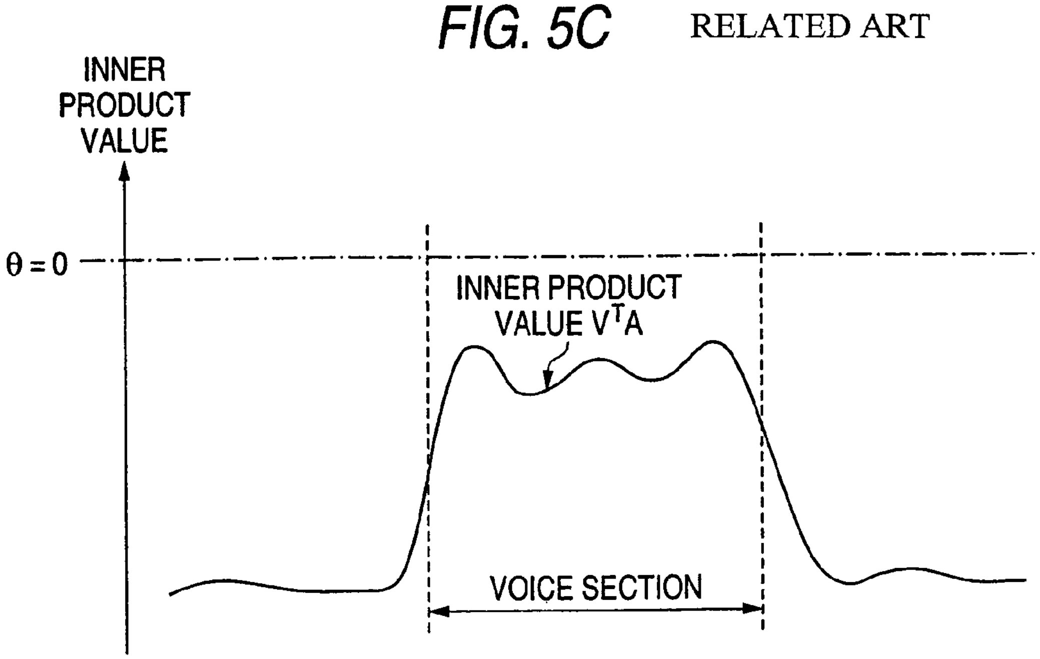
FIG. 5C RELATED ART

Conventionally, in a place where there is a lot of noise with lower S/N ratio, for example, within a chamber of the vehicle, the noise vector is dominant, and the voice vector is relatively smaller, so that the feature vector A of input signal obtained under the actual environment points to an opposite direction to the voice vector and the trained vector V, as shown in FIG. 5B. Accordingly, there is the problem that because the inner product value $V^T A$ between the feature vector A and the trained vector V is a negative (minus) value, the fixed threshold θ (=0) cannot be employed as the determination criterion to detect the voice section correctly.

Figure 2:
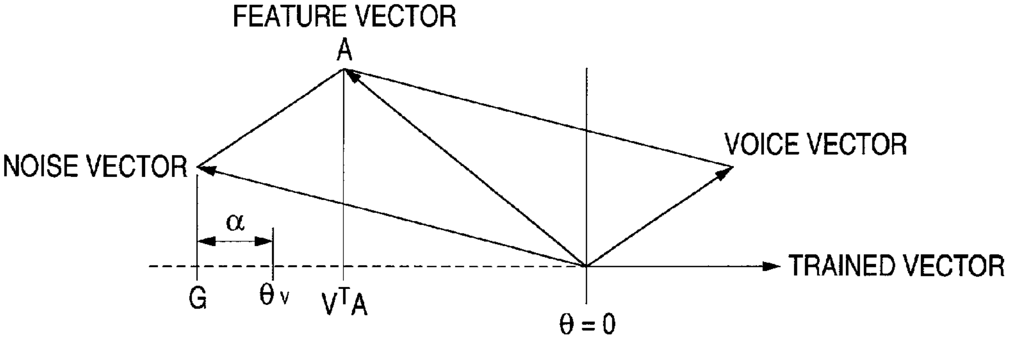
FIG. 2 is a diagram showing the relation of inner product between a trained vector with low SN ratio and a feature vector of input signal.

On the contrary, with the voice recognition system of this embodiment, even if the inner product value $V^T A$ between the feature vector A and the trained vector V is a negative value, the threshold θv can be appropriately adjusted in accordance with the background noise, as shown in FIG. 2. Thereby, the voice section can be detected correctly by comparing the inner product value $V^T A$ with the threshold θv as the determination criterion.

Figure 3:
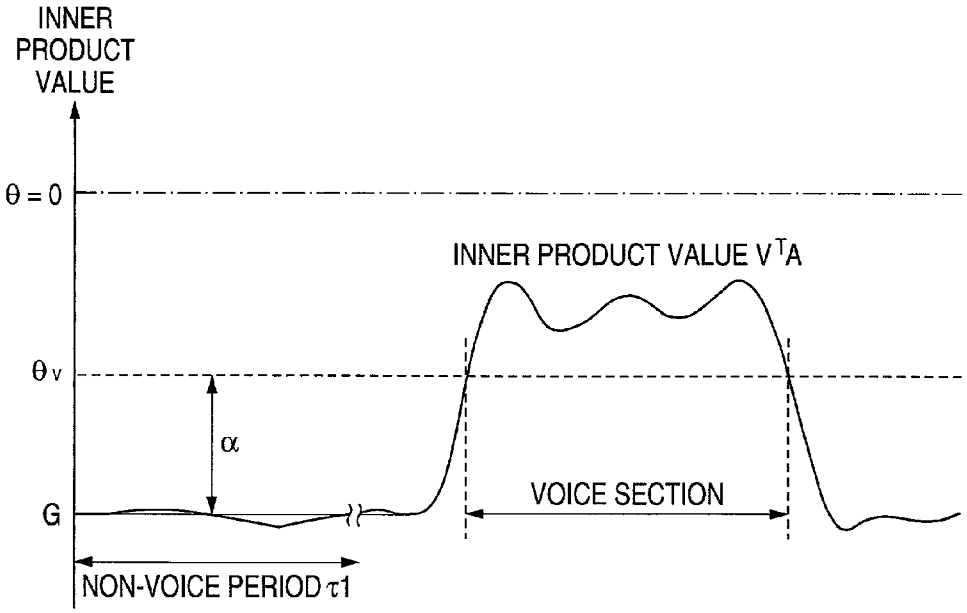
FIG. 3 is a graph showing the relation between variable threshold and inner product value.
Figure 4:
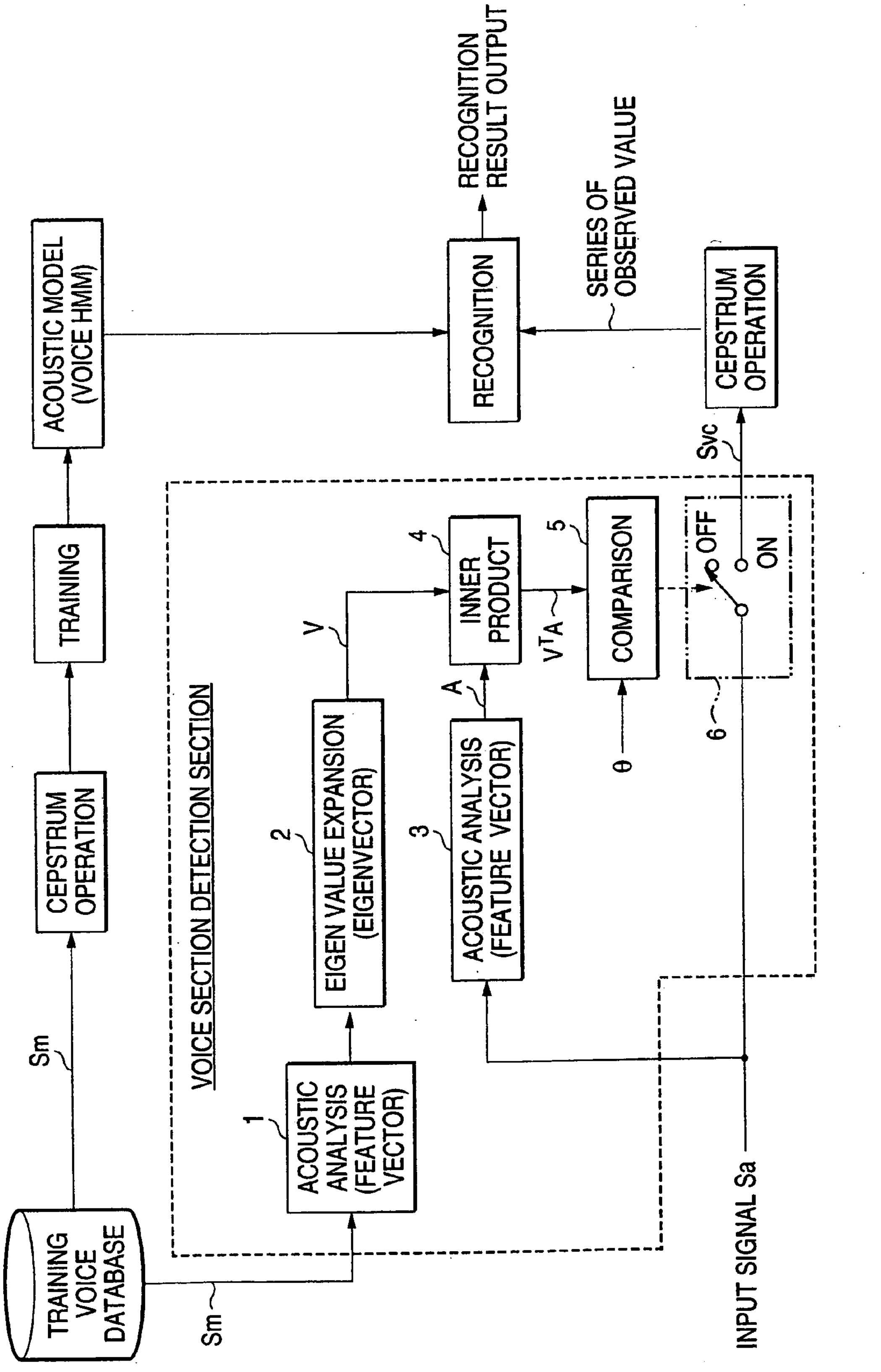
FIG. 4 RELATED ART
FIG. 4 is a block diagram showing the configuration of a voice recognition system for detecting the voice section by applying the conventional vector inner product technique.

In other words, the threshold θv can be appropriately adjusted so that the inner product value $V^T A$ between the feature vector A of the input signal actually spoken and the trained vector V can be above the threshold θv, as shown in FIG. 3. Therefore, the precision of detecting the voice section can be enhanced.

In the above embodiment, the inner product value between the feature vector A and the trained vector V is calculated in the inner product operation section 18 within the non-voice period τ1, the time average value G of the inner product values $V^T A$ for a plurality of frames obtained within the non-voice period τ1 is further calculated, and the threshold θv is defined as this time average value G plus a predetermined adjustment value α.

The present invention is not limited to the above embodiments. The maximum value $(V^T A)$ max of the inner product values $V^T A$ for a plurality of frames obtained within the non-voice period τ1 may be obtained, and threshold θv is defined as the maximum value $(V^T A)$ max plus a predetermined threshold α' experimentally determined, i.e., the value $(V^T A)$ max+α'.

As described above, with the voice recognition system of this invention, the first threshold is generated on the basis of the inner product value between the feature vector of a signal in the non-voice period and the trained vector, and when the voice is actually uttered, the inner product value between the feature vector of input signal and the trained vector is compared with the first threshold to detect the voice section, whereby the detection precision of voice section can be enhanced. That is, since the first threshold that serves as the determination criterion of voice section is adjusted adaptively in accordance with the signal in the non-voice period, the voice section can be detected appropriately by comparing the inner product value between the feature vector of input signal and the trained vector with the first threshold serving as the determination criterion.

Additionally, the first determination section determines the voice section on the basis of the inner product value between the feature vector of input signal and the trained vector, and the second determination section determines the voice section on the basis of the prediction residual power of input signal, and the input signal corresponding to the voice section determined by any one or both of the first and the second determination section is subjected to voice recognition, whereby the voice section of unvoiced sounds and voiced sounds can be detected correctly.

What is claimed is:

1. A speech recognition system comprising:

a speech section detecting section for detecting a speech section that is subjected to speech recognition, the speech section detecting section comprising:

a trained vector creating section for creating a feature of non-speech sounds as a trained vector in advance;

a first threshold generating section for generating a first threshold on the basis of an inner product value between the trained vector and a feature vector of sound occurring within a non-speech period; and a first determination section, if an inner product value between the trained vector and a feature vector of an input signal generated upon uttering the input signal is greater than or equal to the first threshold, for determining the input signal to be the speech section.

2. The speech recognition system according to claim 1, further comprising:

a second threshold generating section for generating a second threshold on the basis of a prediction residual power of an input signal within a non-speech period, and a second determination section for determining a speech section if the prediction residual power of an input signal produced when the speech is uttered is greater than or equal to the second threshold, wherein the input signal in the speech section determined by any one or both of the first determination section and the second determination section is subjected to speech recognition.

* * * * *